United States Patent [19]
Wright

[11] 4,038,816
[45] Aug. 2, 1977

[54] ROTARY ENGINE AND TURBINE ASSEMBLY

[76] Inventor: Charles H. Wright, P.O. Box 367, Sand Hill, Miss. 39161

[21] Appl. No.: 636,370

[22] Filed: Dec. 1, 1975

Related U.S. Application Data

[62] Division of Ser. No. 488,990, July 16, 1974, abandoned.

[51] Int. Cl.² .............................. F02C 7/02; F02C 7/18
[52] U.S. Cl. .................................... 60/39.17; 60/39.66
[58] Field of Search ................ 60/39.17, 39.5, 226 R, 60/280, 317, 319, 39.66, 39.67, 262, 264, 307; 415/117

[56] References Cited

U.S. PATENT DOCUMENTS

| | | | |
|---|---|---|---|
| 3,055,615 | 9/1912 | Kerry | 60/262 |
| 3,121,526 | 2/1964 | Morley | 60/262 |
| 3,216,712 | 11/1965 | Dunkak | 60/39.17 |
| 3,641,766 | 2/1972 | Uehling | 60/39.66 |

Primary Examiner—Carlton R. Croyle
Assistant Examiner—L. J. Casaregola
Attorney, Agent, or Firm—Anthony DeLaurentis

[57] ABSTRACT

A propulsion system useful, for example, for automobiles, comprising an air compressor, a rotary engine, and a multiple stage turbine mounted upon a common shaft, and an infuser section comprising a plurality of nozzles for injecting air into the exhaust gases from the turbine to reduce the temperature and consequently the pressure of the exhaust gases prior to passage into an exhaust pipe.

3 Claims, 6 Drawing Figures

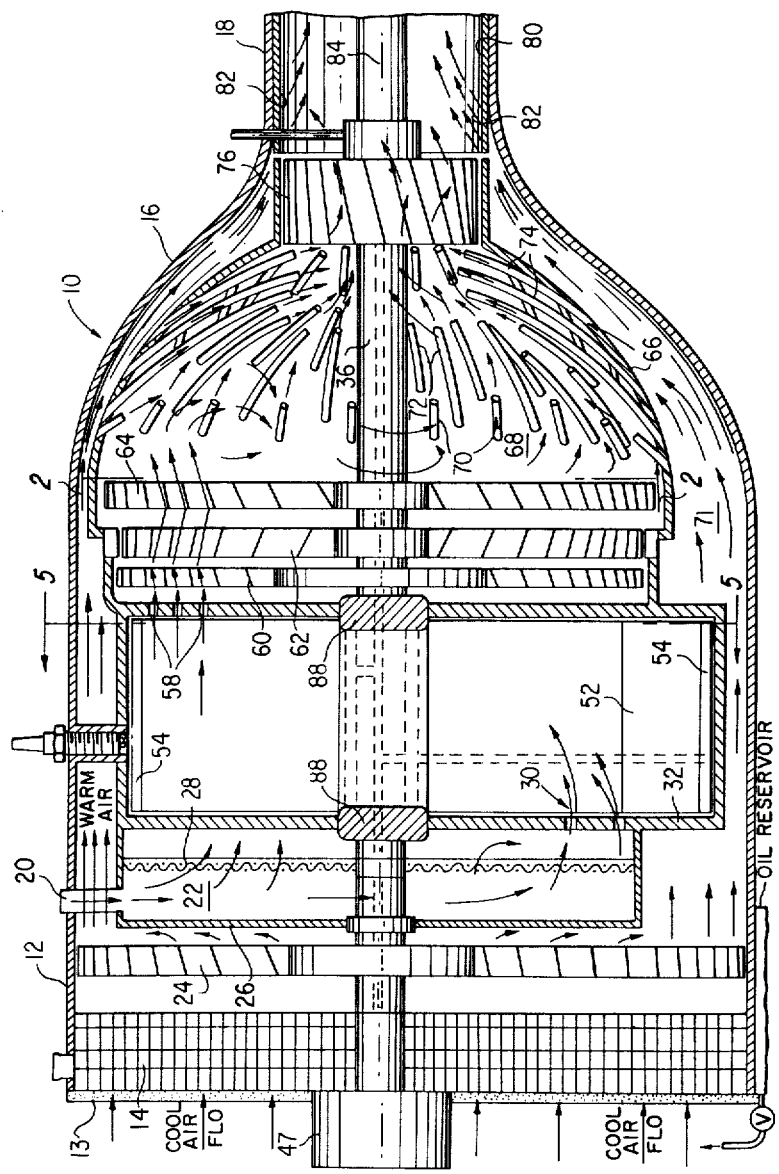

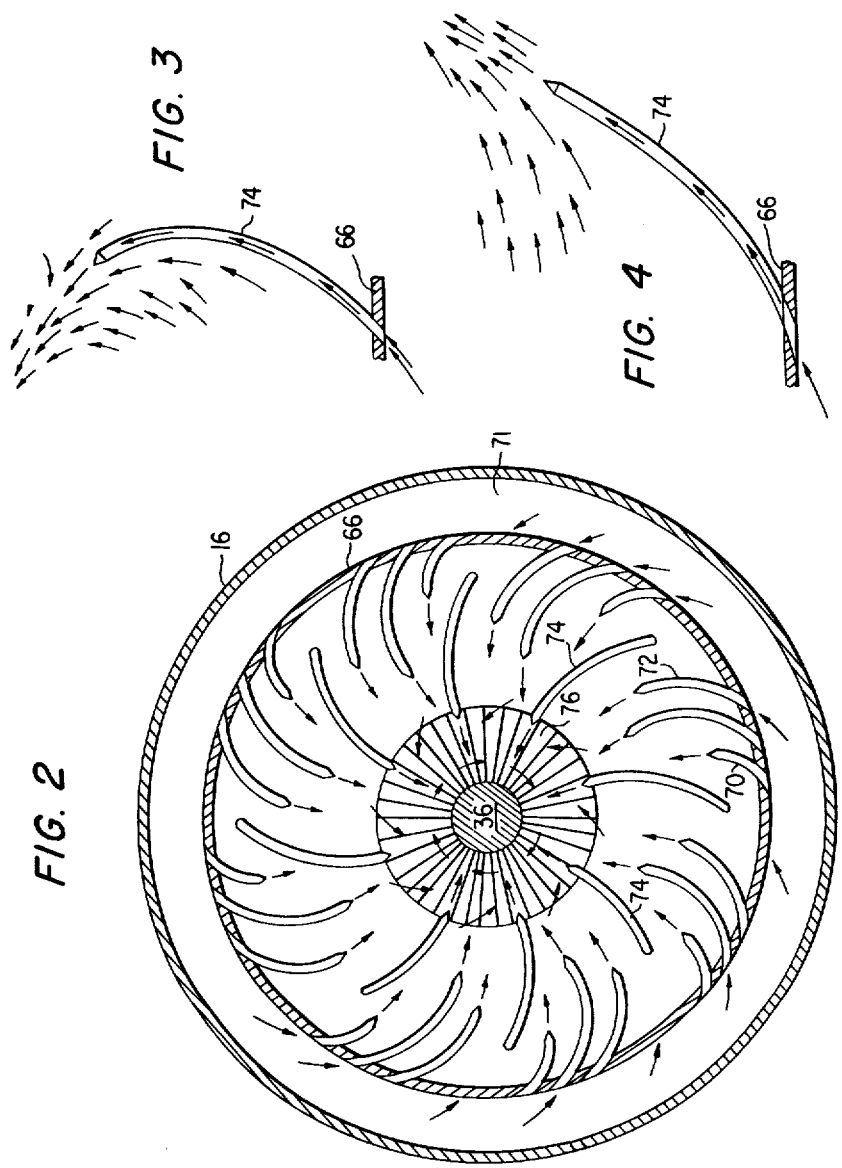

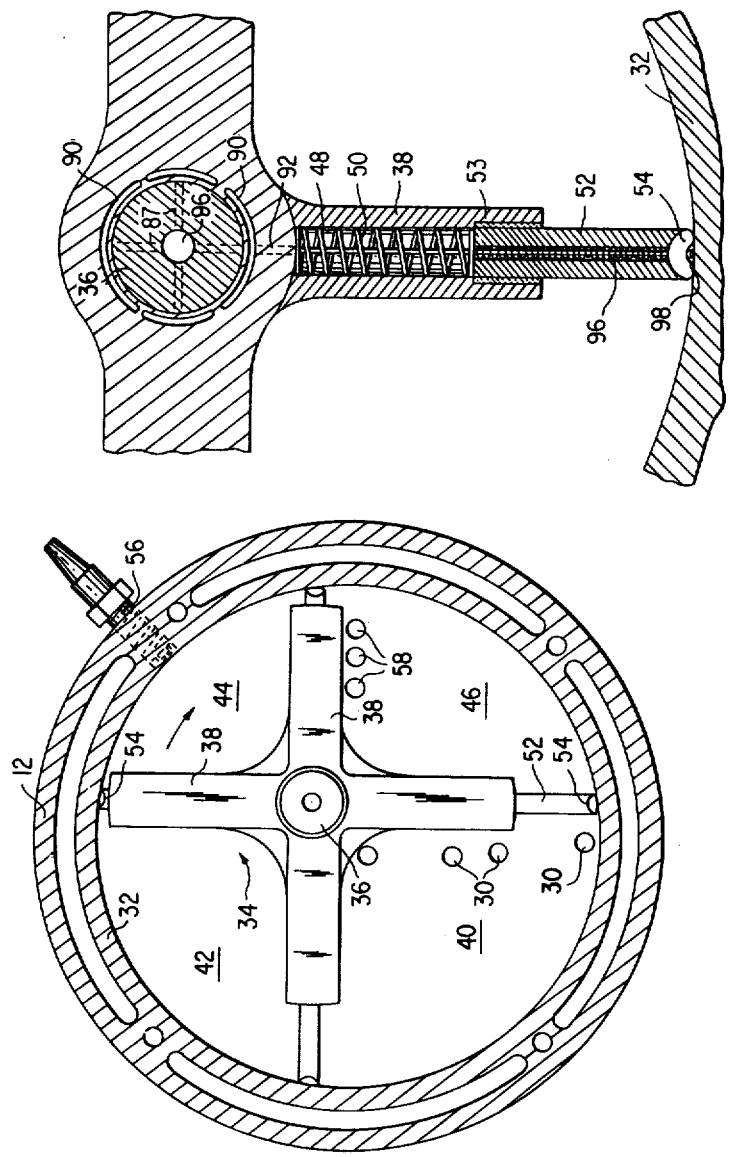

ROTARY ENGINE AND TURBINE ASSEMBLY

This is a division of application Ser. No. 488,990, filed July 16, 1974, now abandoned.

BACKGROUND OF THE INVENTION

The present invention relates generally to propulsion systems, and more particularly to a propulsion system for vehicles such as automobiles wherein a turbine is combined with a rotary engine.

Many efforts have been made to improve propulsion system efficiencies. For example, efforts have been made to employ the principle of the water wheel, which is an efficient type of turbine, in conjunction with burning oil or gas. Thus, the steam turbine employs a boiler for heating water to steam and then blowing the steam against turbine blades. A jet aircraft engine employs a series of fans, one after another, and the thrust of expanding gas against the blades to turn the fans. A substantial part of the fuel is utilized to turn the fans with the remainder producing an exhaust jet to propel the aircraft. Also, only after the aircraft reaches speeds of 400 miles per hour does the engine get sufficient compression from the thrust to completely burn the fuel, and before this the engine is even more inefficient. The above-mentioned engines are, nevertheless, considerable improvements over conventional reciprocating engines which have efficiencies of only about 20%.

Certain rotary engines have now been developed which employ a planetary gear arrangement to achieve compression, however, this causes a reduction in efficiency, and such engines are difficult to seal against loss of compression. Nevertheless, such engines are still more efficient than conventional reciprocating engines.

SUMMARY OF THE INVENTION

It is a primary object of this invention to provide a novel, efficient engine and turbine propulsion system.

Another principal object of the invention is the provision of a rotary engine in conjunction with a turbine for extracting work from the exhaust gases from the engine, which apparatus is relatively compact and suitable for use in propelling vehicles such as automobiles.

Still another object of the invention is to provide an infuser section in which additional air is mixed with combustion gases leaving a turbine in order to lower the temperature and pressure of the gases prior to entry into an exhaust pipe.

The above and other objects, features and advantages of this invention will become more apparent as this description proceeds.

In accordance with the present invention, a suitable fuel, which may be, for example, a mixture of diesel oil and water from a carburetor or homogenizer, is fed into the inlet chamber of a compresser vane type of rotary engine with an eccentric offset of the shaft relative to the housing to achieve compression and vacuum. The outer sections of the vanes are movable radially to accommodate the offset of the shaft and keep the tips of the vanes in contact with the inner surface of the engine housing. Preferably the fuel mixture is initially passed through a remix section in which the fuel is warmed and which is designed to prevent droplets of water from separating from the fuel mixture. The engine interior is subdivided into an intake section, a compression section, a power section, and an exhaust section by the radially adjustable rotating vanes. After the fuel is burned to provide the power stroke in the rotary engine, the exhaust gases are passed to a multi-stage turbine. The first stage of the turbine comprises a plurality of rotary blades disposed in front of stationary blades which redirect the gases. The second turbine stage comprises a second set of rotary blades which are larger in size than those of the first stage since the gases are now at lower pressure than when passing through the first stage. From the turbine the exhaust gases enter an infuser section where warm fresh air is injected through nozzles so that the exhaust gases are cooled and their pressure reduced. The infuser section functions to form a partial vacuum to eliminate back pressure at the first stage turbine rotary blades. The introduction of air into the infuser section has the further advantage of serving to reduce the pollutant level by oxidizing pollutants. Infuser nozzles of different length project into this section from an arcuate dome-like wall. The common shaft for the engine and turbine passes through the center of this wall to transmit power to the power shaft. A final stage turbine wheel may be disposed in this arcuate wall at the point of gas exit around the shaft.

In addition to the rotary engine and turbine being mounted on common shaft, a radiator and other accessories, such as a rotary distributor, may be positioned on the common shaft along with a fan for drawing air through the radiator and passing the warmed air to the infuser section.

BRIEF DESCRIPTION OF THE DRAWINGS

FIG. 1 is a longitudinal cross-sectional view of an engine and turbine assembly in accordance with the presently preferred embodiment of the invention.

FIG. 2 is a transverse cross-sectional view taken on the line 2—2 of FIG. 1 showing the arrangement of the nozzles in the infuser section.

FIG. 3 is a side view of one of the longer infuser nozzles.

FIG. 4 is a top view of the infuser nozzle of FIG. 3.

FIG. 5 is a transverse cross-sectional view taken on the line 5—5 of FIG. 1, showing the arrangement of the vanes in the engine.

FIG. 6 is a detail view, partly in section, showing the construction of one of the vanes.

DETAILED DESCRIPTION OF THE INVENTION

Referring now to the drawings and more particularly, to FIG. 1, reference numeral 10 generally designates an engine and turbine assembly in accordance with a presently preferred embodiment of the invention. The assembly comprises an outer housing 12 of generally cylindrical configuration over most of its length. At one end of the housing, extending over essentially its entire cross section, is a dust filter 13 and a finned heat exchanger, e.g., a radiator 14. The other end of the housing comprises an arcuate, dome-shaped section 16 merging into a smaller cylindrical exhaust pipe housing 18.

A combustible mixture such as a mixture of air combined with a fuel mix, for example, of water and diesel oil from a carburetor (not shown) is passed through an inlet conduit 20 in the housing 12 into a remix chamber 22. In the remix chamber, the combustible mixture is warmed by indirect heat exchange with air which has been drawn through radiator 14 by suction fan 24 which functions as an air compressor and warmed by extracting heat from the coolant in the radiator. The warm air leaving fan 24 which is an impeller fan with fixed blades passes around the housing 26 in which the chamber 22 is located so that there is indirect heat exchange through the walls of housing 26. The combustible mixture is drawn through the chamber 22 by an impeller fan 28 and introduced through inlet ports 30 into the intake region within an engine housing 32. The remix section serves to prevent droplets of water separating out of the combustible mixture, helps to vaporize and preheat the fuel mixture, and provides the engine with a large charge of the fuel-air mixture.

With housing 32 there is a compressor vane type of rotary engine 34 (FIG. 5) which is located in the housing with an eccentric offset of its shaft 36 relative to the center of the housing 32. Shaft 36 is supported by suitable bearings at its ends and where the shaft passes through stationary parts of the system. The engine 34 has four radially extending partitions or vanes 38 which divide the housing 32 into four sections. With the vanes 38 in the position shown in FIG. 5, the lower left chamber 40 comprises the intake section, the upper left chamber 42 is the compression section, the upper right chamber 44 is the power section, and the lower right chamber 46 is the exhaust section. It will of course be understood that the areas of the chambers vary as the vanes rotate.

A suitable packaged accessory system 47 may be attached to the shaft 36. For example, this system 47 may comprise a starter which functions as a motor while starting and then as a generator while the engine is running.

FIG. 6 illustrates an arrangement for sealing the various chambers from communication with each other by means of adjusting the length of the vanes. Each vane 38 has a radial bore 48 in which there is a compression spring 50 and one end of a blade 52. This inner end of blade 52 slides within a ceramic seal 53 in radial bore 48. At the outer end of blade 52 there is a sealing member comprising a ceramic vane rocker 54 which is in sealing engagement with the inner wall of housing 32 and maintains such engagement as the ceramic member wears by virtue of the compression spring forcing this member outwardly. As a given vane 38 rotates from a position of maximum extension of blade 52, which occurs when the blade is in the inlet chamber 40; the blade 52 is pushed further into bore 48 against the bias of spring 50. When the vane reaches the region which serves to define the power section 44, the blade 52 is essentially completely retracted into bore 48 with only the ceramic vane rocker 54 extending out beyond the end of the respective vane 38. Thus, FIG. 5 shows the upper vane 38 with the blade 52 in an essentially completely retracted position.

After the combustible mixture is compressed in compression chamber 42, the mixture is swept into the power chamber. The right side blade 52 is slightly extended since the shaft 36 is eccentric and closer to the top of the housing 32 than to the right side of the housing. In this fashion a greater area is acted upon by the gases to rotate the vanes clockwise. The combustible mixture is then ignited by spark plug 56 and burned in known fashion, producing power which rotates the vanes and consequently the shaft 36 to provide power for the propulsion system. The exhaust gases are then swept out of the exhaust chamber 64 through exhaust ducts 58. The exhaust gases impinge upon a first set of appropriately contoured rotating turbine blades 60 which are fixed to the shaft 36. The hot exhaust gases, which are under high pressure and still expanding, turn the blades in a direction to augment the power from the rotary engine while the gases are themselves redirected in another direction. The exhaust gases now contact a set of stationary blades 62 which redirect the lower pressure exhaust gases to a second set of rotating turbine blades 64 also mounted on shaft 36. The turbine blades 64 are larger in size than the blades 60 in view of the reduction in pressure of the gases by the time the second set of turbine blades is reached.

The exhaust gases leaving the turbine blades 64 enter a dome-shaped inner housing 66 containing an infuser chamber 68. Housing 66 is spaced inwardly out of contact with the dome-shaped section 16 of the outer housing 12 in order to provide an air passage or duct 71 therebetween.

The air passed by fan 24 around the housing 26 to heat the incoming combustible mixture is also passed around the engine housing 32 into duct 71 between the arcuate outer housing section 16 and the inner housing 66. From duct 71 the warm air, which is at a considerably lower temperature than that of the exhaust gases, is injected into the infuser chamber 68 through a plurality of different size nozzles. The nozzles include a first set of relatively short tubular nozzles 70 projecting radially inwardly from a region close to the discharge side of the rotary turbine blades 64. Downstream of the short nozzles 70 there are a plurality of intermediate length nozzles 72, and finally longer nozzles 74. These nozzles direct the incoming air toward a third or final stage turbine consisting of a turbine wheel 76 located contiguous to the exhaust pipe and tubular discharge housing 18. It is believed that a generally conically shaped area of lower pressure or vacuum is formed about shaft 36 with the point of the cone being contiguous to the turbine wheel 76, and it is believed that along the edges of this region there is an increased incidence of oxidation of pollutant particles. In the vicinity of the turbine wheel 76, further minor ignition may occur of any unburned fuel.

FIGS. 2 through 5 further illustrate the location of the nozzles and schematically indicate the influence of the incoming air on the exhaust gases. Thus, FIGS. 3 and 4 show an aspirating effect in which the incoming air draws along the exhaust gases which are directed toward the turbine wheel 76. The nozzles are positioned so that the air and consequently the exhaust gases are directed in a direction to turn the blades of turbine wheel 76. The incoming air greatly reduces the temperature of the exhaust gases and consequently the pressure of the gases. In the infuser section 68, the incoming warm air from duct 71 acts upon exhaust gases similarly to a condenser forming a vacuum to some degree which eliminates back pressure at the first stage turbine.

Additional energy is extracted from the gases by the turbine wheel 76 which is mounted on the shaft 36. Thereafter the exhaust gases enter exhaust pipe 80. Additional warm air from duct 71 enters exhaust pipe 80 behind turbine wheel 76 through inlets 82. Thus, there may be a further partial vacuum formed behind the turbine wheel 76. Additional oxidation of pollutants and condensation may occur in this region. These gases then pass about a shaft 84 which in essence is an extension of the shaft 36 and which constitutes the power shaft of the propulsion system.

All parts of the system are constructed of materials to withstand the operating conditions at that point in the system. For example, the infuser tubes tubes may be made of steel tubing such as ½ inch tubing with provision for screwing ⅜ inch diameter nozzles onto the ends of the tubes.

There is an oil passage 96 in the center of shaft 36 for supplying oil which is also a coolant to full flow bearings 88 via radial oil passageways 87. The oil is supplied from an oil reservoir adjacent and beneath (as viewed in FIG. 1) the heat exchanger 14.

All bearings are of the roller full flow type (oil in one side and out the other) and are preferably triple sealed and made to withstand 1,000° F. Such bearings are commercially available.

Four arcuate axial oil passageways 90, one for each vane, supply oil to lubricate the ceramic seals 54. The oil from passageways 90 flows through radial orifices 92 into bores 48 in vanes 38. The oil then flows laterally in bores 94 in blades 52 into a pair of radial orifices 96 in each blade which lead to a slot 98 in the face of the ceramic vane rocker 54. The reciprocation of the blades 52 results in these members functioning as internal oil pumps. Centrifugal force also aids in lubricating the rockers at the ends of the blades.

While a presently preferred embodiment of the invention has been shown and described with particularity, it will be appreciated that various changes and modifications may readily suggest themselves to those of ordinary skill in the art upon being apprised of the present invention. Accordingly, it is intended to encompass all such changes and modifications as fall within the scope and spirit of the appended claims.

I claim:

1. An apparatus comprising:
   an outer housing;
   an inner housing disposed in said outer housing;
   a turbine disposed in said inner housing;
   a chamber disposed in said outer housing downstream of said inner housing and in fluid communication with said turbine;
   discharge means mounted downstream of said chamber for discharging gases therefrom;
   said outer housing having a wall portion spaced from said inner housing and said chamber to define an air duct, said air duct being in fluid communication with said chamber;
   means for introducing high pressure gases into said turbine; whereupon the gases pass through said turbine into and through said discharge means;
   a plurality of elongated tubular nozzles being directed into said chamber to establish said fluid communication with said air duct, said nozzles comprising at least a first set of relatively short tubular nozzles projecting into said chamber and a second set of relatively longer tubular nozzles projecting into said chamber, said longer nozzles being disposed downstream from said shorter nozzles, said nozzles having inlets which lie in fluidic flow cooperation with said air duct and outlets which direct the incoming air toward said discharge means, said inlets being flush with the wall of said chamber and said outlets being disposed predetermined varying distances within said chamber;
   means for introducing air into said air duct whereupon at least a portion of the air enters said chamber through said nozzles, said air mixing with the gases discharged into said chamber from said turbine and discharging through said discharge means in admixture therewith.

2. Apparatus according to claim 1, further comprising additional turbine means provided at said discharge means, a shaft for said turbine and said additional turbine means extending through said discharge means, and at least some of said nozzles being positioned to direct air and gases toward said additional turbine means.

3. Apparatus according to claim 2, further comprising means to supply additional air from said duct into said discharge means downstream of said additional turbine means.

* * * * *